US008677251B2

(12) United States Patent  (10) Patent No.: US 8,677,251 B2
Kwok et al.  (45) Date of Patent: Mar. 18, 2014

(54) CREATION AND SUGGESTION OF CONTACT DISTRIBUTION LISTS

(75) Inventors: Alton Kwok, Redmond, WA (US);
Stephen DeWitt Sisk, Seattle, WA (US);
Adam C. Czeisler, Seattle, WA (US);
Steven Karl Abrahams, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 12/130,896

(22) Filed: May 30, 2008

(65) Prior Publication Data

US 2009/0300546 A1  Dec. 3, 2009

(51) Int. Cl.
*G06F 3/00* (2006.01)
(52) U.S. Cl.
USPC .......................................... 715/752
(58) Field of Classification Search
USPC ......................................... 715/752
See application file for complete search history.

(56) References Cited

U.S. PATENT DOCUMENTS

| 6,829,607 | B1 | 12/2004 | Tafoya et al. | |
| 6,952,805 | B1* | 10/2005 | Tafoya et al. | 715/739 |
| 2001/0002469 | A1* | 5/2001 | Bates et al. | 707/1 |
| 2003/0080998 | A1* | 5/2003 | Gonzalez | 345/751 |
| 2003/0093483 | A1 | 5/2003 | Allen et al. | |
| 2005/0188043 | A1 | 8/2005 | Cortright et al. | |
| 2005/0198180 | A1 | 9/2005 | Khanolkar et al. | |
| 2006/0004843 | A1 | 1/2006 | Tafoya et al. | |
| 2007/0047702 | A1 | 3/2007 | Newell et al. | |
| 2007/0050456 | A1* | 3/2007 | Vuong et al. | 709/206 |
| 2007/0130526 | A1* | 6/2007 | Allwright et al. | 715/752 |
| 2007/0198474 | A1 | 8/2007 | Davidson et al. | |
| 2007/0250588 | A1 | 10/2007 | Hogan et al. | |
| 2007/0255789 | A1* | 11/2007 | Buchheit | 709/206 |
| 2008/0071873 | A1* | 3/2008 | Gross | 709/206 |
| 2009/0049392 | A1* | 2/2009 | Karttunen et al. | 715/762 |
| 2009/0111447 | A1* | 4/2009 | Nurmi | 455/418 |

FOREIGN PATENT DOCUMENTS

EP  1785924  5/2007

OTHER PUBLICATIONS

"Email Distribution Lists", at <<http://www.webcom.com/help/exp/>>, Verio Inc., 1996-2007, pp. 1-3.
"Npust Email List Manager", retrieved on Dec. 7, 2007, at <<http://www.programurl.com/npust-email-list-manager.htm>>, pp. 1-2.
"Personalizing Emails to your Distribution List Using Custom Variable", at <<http://www.questionpro.com/help/100-inline.html>>, 2006, pp. 1-9.

* cited by examiner

*Primary Examiner* — Sara England
*Assistant Examiner* — Angie Badawi
(74) *Attorney, Agent, or Firm* — Sung Kim; Andrew Sanders; Micky Minhas (57) ABSTRACT

Techniques described herein allow for suggesting creation of distribution lists and suggesting use of distribution lists once they have been created. For instance, these techniques may track a frequency with which contacts (e.g., email addresses, phone numbers, screen names, etc.) are used with one another. The techniques may then suggest that a user create a distribution list that includes those contacts. Furthermore, once a contact has been associated with a particular distribution list, these techniques may suggest that a user send a message to this distribution list in response to the user selecting the contact (rather than the list) as a destination of the message.

17 Claims, 10 Drawing Sheets

CREATION AND SUGGESTION OF CONTACT DISTRIBUTION LISTS

BACKGROUND

Distribution lists are helpful when a user wishes to send a communication to a large group of contacts on a regular or periodic basis. For instance, if a user often sends email messages to a particular group of people that the user works with, then the user may choose to create an email distribution list that includes each email address corresponding to the particular group of people. After the user creates this list, the user may then conveniently send an email to each listed email address by merely specifying the created list in the address well of the email.

However, many email users choose not to create such distribution lists for multiple different reasons. For instance, some users do not know of an email application's ability to create a distribution list. Furthermore, even if these users know of the capability, many users determine that the initial cost of creating the list outweighs the benefit of actually employing the created list. That is, some users determine that the time it takes to navigate the application to find and employ this functionality outweighs the benefit of using the list. Therefore, many of these users merely find a previous email to or from the particular group of the people and then either "reply to all" of the listed email addresses or copy the listed addresses into a new message window.

Finally, many users have developed a habit of sending emails according to the names of individuals, rather than lists. That is, when a user wishes to send an email to "John Jones", the user is likely to associated the word "John" with the corresponding email address, rather than the name of the list to which John and others belong (e.g., "Work").

While distribution lists for emails, voicemails, and other communications have proven very useful, the creation and use of these distribution lists may be improved.

SUMMARY

This document describes tools for suggesting creation of distribution lists and suggesting use of distribution lists once they have been created. For instance, these tools may track a frequency with which contacts (e.g., email addresses, phone numbers, screen names, etc.) are used with one another. The tools may then suggest that a user create a distribution list that includes those contacts. Furthermore, once a contact has been associated with a particular distribution list, these tools may suggest that a user send a message to this distribution list in response to the user selecting the contact (rather than the list) as a destination of the message.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

FIG. 5 depicts another illustrative UI that may displayed when a user begins to type an email address into an address well of a message window. Here, the UI not only lists those contacts that may match the email address being typed, but also lists one or more distribution lists that these contacts are members of.

DETAILED DESCRIPTION

This document describes tools for suggesting creation of distribution lists and suggesting use of distribution lists once they have been created. For instance, these tools may track a frequency with which contacts (e.g., email addresses, phone numbers, screen names, etc.) are used with one another. The tools may then suggest that a user create a distribution list that includes those contacts. These tools may also suggest contacts based on a frequency with which contacts are used with one another. Furthermore, once a distribution list has been created that includes a particular contact, these tools may suggest that a user send a message to this distribution list in response to the user selecting the particular contact (rather than the list) as a destination of the message.

The claimed tools therefore provide for a highly discoverable way for a user to create distribution lists. Furthermore, by tracking a frequency with which contacts are used with one another, the tools intelligently suggest which contacts to include with a particular distribution list. By suggesting the use of distribution lists in response to users entering an individual contact or contacts as a destination of a message, these tools also encourage efficient use of the created distribution lists.

The discussion begins with a section entitled "Illustrative Architecture", which describes one non-limiting environment that may implement the claimed tools. A section entitled "Illustrative User Interfaces" follows. This section illustrates and describes illustrates user interfaces (UIs) that may allow for efficient creation and use of distribution lists. A third and final section, entitled "Illustrative Processes", describes processes for creating and employing distribution lists in the architecture of FIG. 1 as well as other architectures.

This brief introduction, including section titles and corresponding summaries, is provided for the reader's convenience and is not intended to limit the scope of the claims, nor the proceeding sections.

Illustrative Architecture

Figure 1:
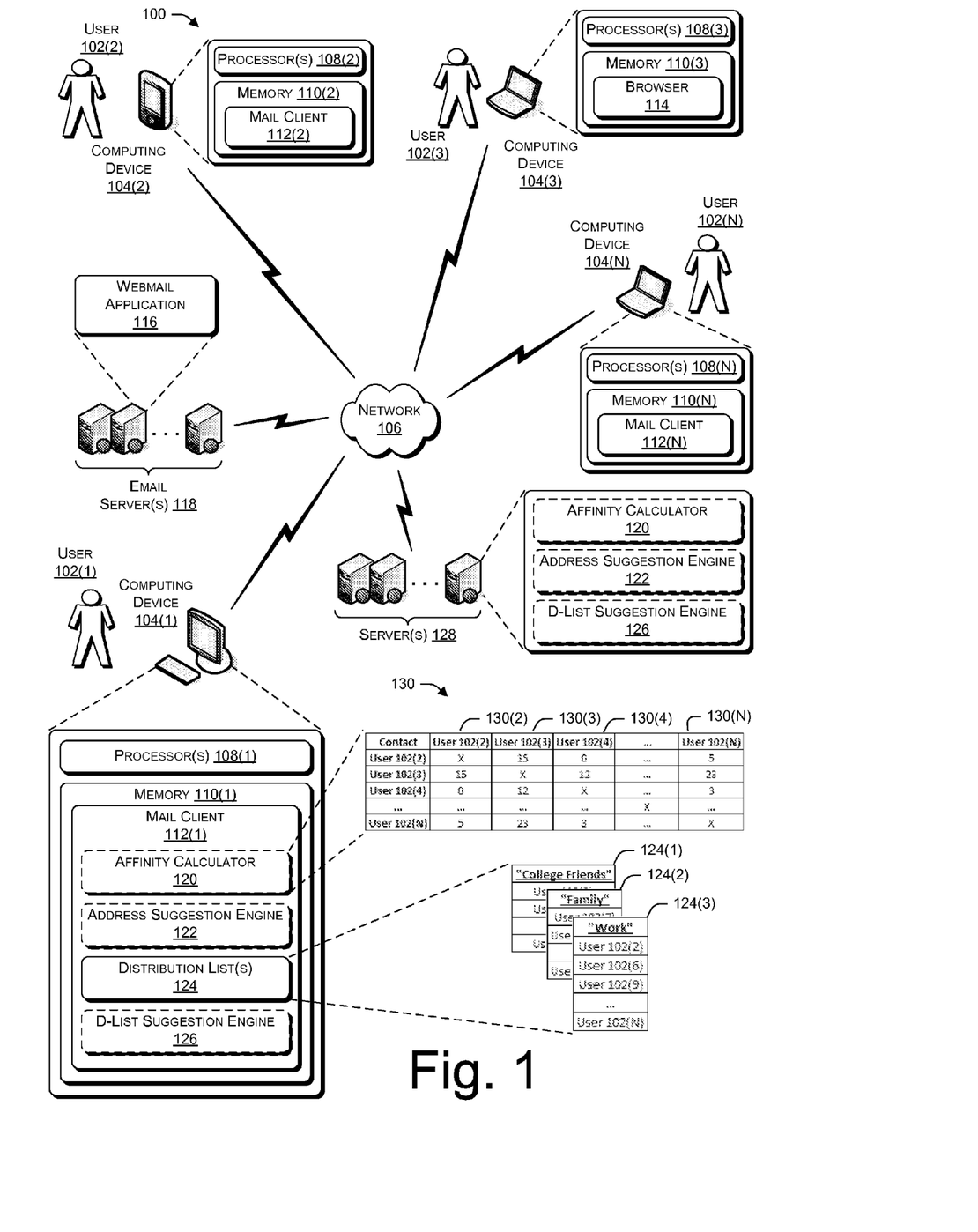
FIG. 1 depicts an illustrative architecture in which applications, such as an email application, may suggest creation of a distribution list, such as an email distribution list. These applications may also suggest using these created distribution lists in response to a user selecting a contact associated with a distribution list as a destination of a message.

FIG. 1 depicts an illustrative architecture 100 that may employ the described techniques. As illustrated, FIG. 1 includes one or more users 102(1), (2), . . . , (N) operating computing devices 104(1), (2), . . . , (N) for the purpose of sending and receiving messages, such as emails, over a network 106. Computing devices 104(1)-(N) may comprise any sort of device capable of accessing messages such as emails. For instance, devices 104(1)-(N) may include personal computers, laptop computers, mobile phones, set-top boxes, game consoles, personal digital assistants (PDAs), portable media players (PMPs) (e.g., portable video players (PVPs) and digital audio players (DAPs)), and the like. Note that network 106, which couples computing devices 104(1)-(N), may comprise the Internet, a Local Area Network (LAN), a Wide Area Network (WAN), a wireless network, and/or the like.

Each of computing devices 104(1)-(N) include one or more processors 108(1), (2), . . . , (N), as well as memory 110(1), (2), . . . , (N), upon which a mail client 112(1), (2), . . . , (N) may reside. As illustrated, computing device 104(1), (2) and (N) include mail client 112(1), (2), and (N), respectively (i.e., each device stores a "desktop-based mail client"). Computing device 104(3), meanwhile, includes a browser 114 stored in memory 110(3). Here, user 102(3) employs browser 114 to access a webmail application 116 stored on one or more email servers 118. As such, user 102(3) employs a web-based email application rather than a desktop-based mail client.

Each mail client or mail application is associated with a particular email address for a particular user or other entity. For instance, mail client 112(1) of user 102(1) may have an email address of "User_102(1)@email.com". Each mail application of the remaining users may similarly be associated with a particular email address. Furthermore, while FIG. 1 illustrates that each mail client (and corresponding email address) is associated with an individual, it is specifically noted that email addresses may be associated with other entities (e.g., a business, a school, customer service, etc.).

As discussed above, each of users 102(1)-(N) operates a respective mail client or webmail application to send or receive emails over network 106. Architecture 100 may function to create and suggest use of email distribution lists while users 102(1)-(N) send and receive these emails. It is specifically noted, however, that FIG. 1 represents but one of many architectures that may employ the claimed techniques. For instance, the claimed techniques may be similarly employed for voicemail distribution lists, instant messaging distribution lists, short messaging service (SMS or "text messaging") distribution lists, and/or any other form of communication that employs distribution lists to allow a user to send communications to multiple contacts.

In the instant example, mail client 112(1) associated with user 102(1) may include an affinity calculator 120, an address suggestion engine 122, one or more distribution lists 124, and a distribution-list (D-List) suggestion engine 126. In some instances, one or more servers 128 associated with mail client 112(1) may additionally or alternatively store or have access to affinity calculator 120, address suggestion engine 122, and distribution-list suggestion engine 126. Furthermore, each of mail clients 112(2) and (N), as well as webmail application 116, may include some or all of these modules to perform similar or the same functions for users 102(2)-(N).

Whether stored on computing device 104(1) or servers 128, affinity calculator 120 functions to determine an affinity between user 102(1) (and/or other users employing mail client 112(1)) and each of multiple other email addresses. For instance, affinity calculator 120 may calculate an affinity between user 102(1) (and/or the corresponding email address of user 102(1)) and email addresses associated with mail clients 112(2) and 112(N), as well as webmail application 116 associated with user 102(3). As such, affinity calculator 120 may calculate an affinity between user 102(1) and each of users 102(2)-(N).

To do so, affinity calculator 120 may track a frequency that each email address associated with users 102(2)-(N) is used with one another. For instance, calculator 120 may calculate, for each email address of users 102(2)-(N), a number of emails that user 102(1) sends and/or receives that includes each of the other email addresses. For instance, if user 102(1) sends an email to user 102(2) and user 102(3), affinity calculator may add this email to the number of times that user 102(3) is included when emails are sent to user 102(3). Affinity calculator 120 may similarly add this email to the number of times that user 102(2) is included when emails are sent to user 102(2).

FIG. 1 illustrates that affinity calculator 120 may store or have access to a table 130 that stores a number of times that each of these email addresses are used with one another. Table 130 includes a column 130(2), (3), . . . , (N) (as well as a row) corresponding to each of users 102(2)-N. Here, table 130 has tabulated a number of times that email addresses associated with users 102(2)-(N) have been included in email sent from user 102(1) (i.e., from mail client 112(1)).

As illustrated, the first row of table 130 shows that user 102(1) has sent fifteen emails that included both user 102(2) and user 102(3). User 102(1), however, has never sent an email to both user 102(2) and user 102(4) (not illustrated). Finally, table 130 shows that user 102(1) has sent five emails that included both user 102(2) as well as user 102(N).

Moving to the next row, table 130 again shows that user 102(1) has sent fifteen emails that include both user 102(2) and user 102(3). Next, user 102(1) has sent twelve emails to both user 102(3) and user 102(4). Finally, this row of table 130 illustrates that user 102(3) and user 102(N) have been included on a same email from user 102(1) twenty-three times.

Moving to the row associated with user 102(4), table 130 again illustrates that user 102(1) has never sent an email that included both user 102(4) and user 102(2). Table 130 also again illustrates that user has sent twelve emails that included user 102(4) and user 102(3). Finally, the row associated with user 102(4) illustrates that user 102(1) has sent three emails that included both the email address of user 102(4) and the email address of user 102(N).

The last row of table 130 is associated user 102(N). This row illustrates the number of times that user 102(1) has sent emails to both user 102(N) as well as each other email address associated with users 102(1)-(N−1). Because user 102(N) is the last user in table 130, each of these tracked frequencies are illustrated and discussed with reference to the previous rows of the table.

By tracking an affinity between each of the email addresses employed by user 102(1), mail client 112(1) may intelligently suggest creation of distribution lists that include those email addresses that are found to have a strong affinity. For instance, affinity calculator may determine that user 102(1) often sends emails to a particular subset of the email addresses associated with user 102(2)-(N). Based on this tracked frequency, mail client 112(1) may then suggest creating a distribution list that includes these members, as discussed in detail below.

Figure 2:
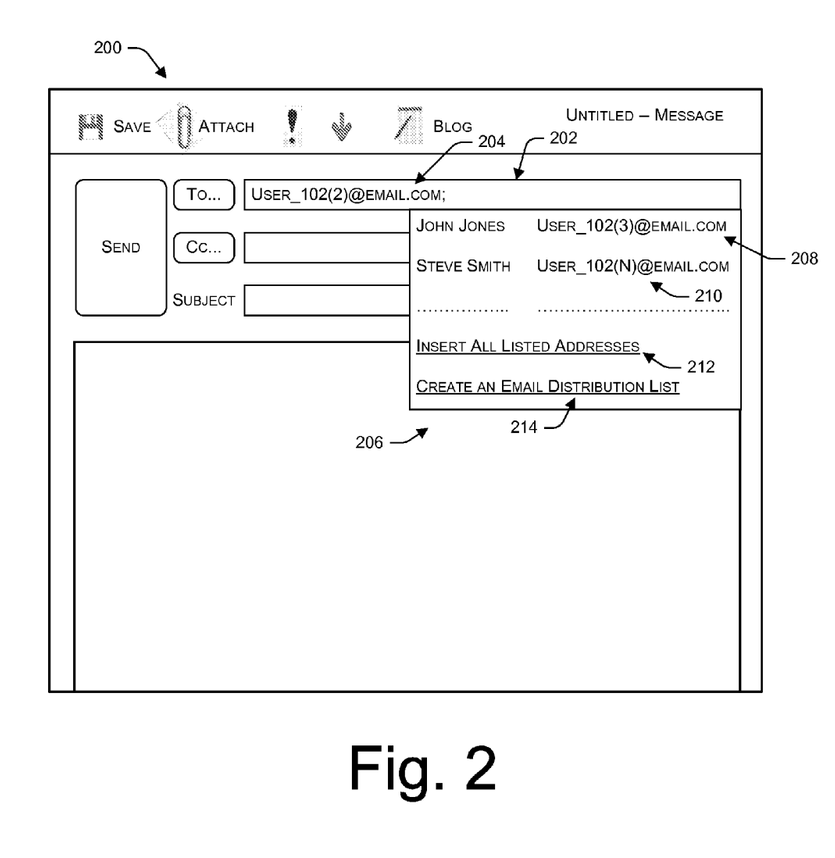
FIG. 2 depicts an illustrative user interface (UI) that allows a user to create an email distribution list in response to entering an email address into an address well of a message window. This UI also allows the user to select, as additional destinations for the message, those email addresses that have been frequently used together with the email address already entered in to the address well.
Figure 3:
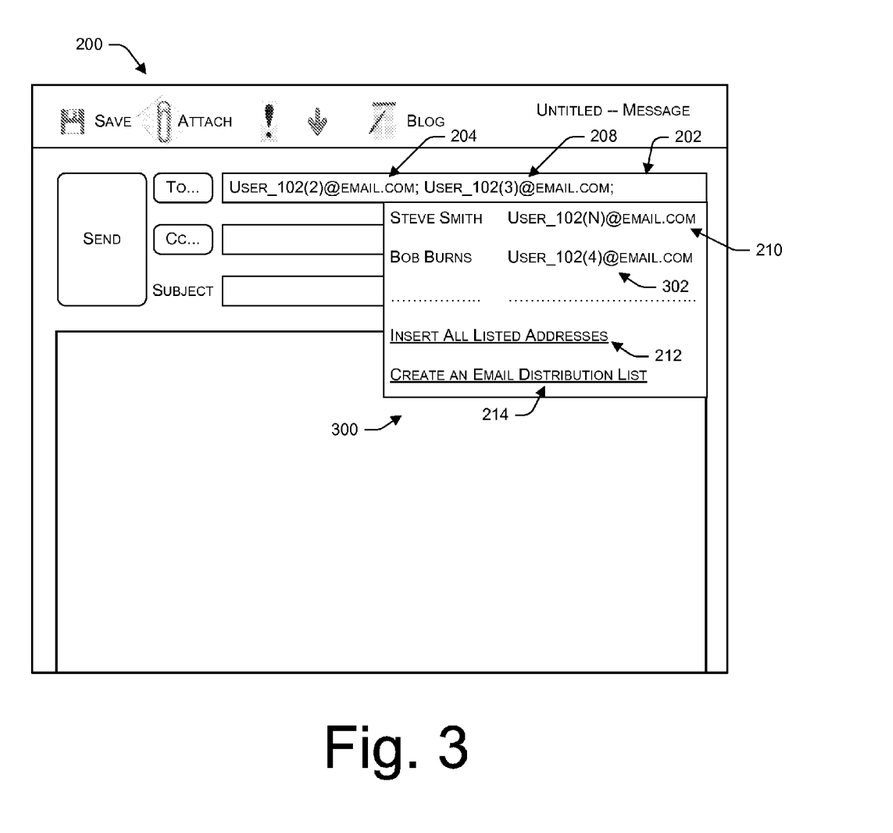
FIG. 3 continues the illustration of FIG. 2 and depicts another illustrative UI. Here, the user has selected an additional email address as a destination of the message. The UI therefore allows the user to select additional email addresses that have been frequently used together with either or both of the email addresses already entered into the address well.

Furthermore, mail client 112(1) may also include address suggestion engine 122 to suggest particular email addresses to user 102(1) when user 102(1) composes a new email. For instance, if user 102(1) begins to compose an email by specifying an email address associated with user 102(2) as a destination, address suggestion engine 122 may suggest that user 102(1) also include the email address associated with user 102(3) as a destination of the email. As table 130 illustrates and as discussed above, user 102(1) has sent fifteen emails that included both user 102(2) and user 102(3). Therefore, address suggestion engine 122 may imply a likelihood that user 102(1) would like to send an email to user 102(3) when user 102(1) specifies user 102(2) as a destination for an email. Conversely, because user 102(1) has never sent an email to both user 102(2) and user 102(4), address suggestion engine may refrain from suggesting user 102(4) as a destination for this particular email. FIGS. 2-3 depict illustrate user interfaces (UIs) that include suggesting different email addresses based on the tracked frequencies stored in table 130.

In addition to suggesting particular email addresses, mail client 112(1) includes distribution-list suggestion engine 126, which may suggest one or more distribution lists when user 102(1) composes an email. As illustrated, mail client 112(1) includes distribution lists 124(1), (2), and (3). User 102(1) has labeled distribution list 124(1) "College Friends". As such, distribution list 124(1) likely includes email addresses associated with college friends of user 102(1). Similarly, distribution list 124(2) likely includes email addresses of "family" members of user 102(1), while distribution list 124(3) (entitled "Work") likely includes co-workers of user 102(1). When user 102(1) composes an email with mail client 112(1), user 102(1) may select one or more of distribution lists 124(1)-(3) to send the email to each email address that the selected list includes.

With use of lists 124(1)-(3), distribution-list suggestion engine 126 may suggest one or more distribution lists to user 102(1) based on emails entered into an address well of a new email. For instance, distribution list 124(3) (the user's "Work" distribution list) is shown to include user 102(2) as a member. Therefore, when user 102(1) enters the email address associated with user 102(2) into an address well of an email, distribution-list suggestion engine 126 may recognize that this email address is a member of distribution list 124(3). As such, engine 126 may suggest to user 102(1) to enter the entire distribution list into the address well of the email.

Figure 5:
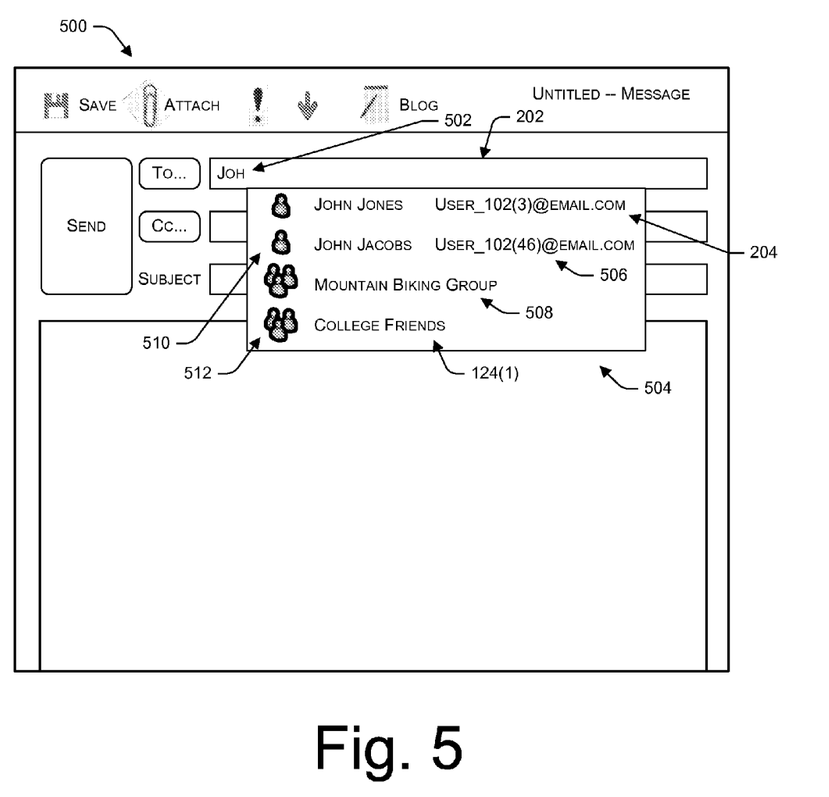

If user 102(2) is also a member of another distribution list (e.g., list 124(1) and/or 124(2)), then engine 126 may similarly suggest this list or lists. Furthermore, because distribution list 124(3) also includes users 102(6), 102(9), and 102(N), engine 126 may also suggest distribution list 124(3) to user 102(1) if user 102(1) enters one or more of these email addresses into an address well of a new email. FIG. 5 illustrates a UI that includes a distribution-list suggestion made by distribution-list suggestion engine 126.

Distribution-list suggestion engine 126 may additionally suggest creation of new distribution lists. For instance, if affinity calculator 120 determines that a strong affinity exists between the email address associated with user 102(3) and the email address associated with user 102(N) (based on the tracking of the twenty-three emails that include these addresses), then engine 126 may suggest that user 102(1) create a distribution list that includes these addresses (and potentially others). FIGS. 2-3, discussed immediately below, illustrate illustrative UIs that include such suggestions.

Illustrative User Interfaces (UIs)

FIG. 2 depicts an illustrative message window 200 that allows user 102(1) to create and send an email to one or more addresses, such as one or more addresses corresponding to users 102(2)-(N). Message window 200 includes an address well 202 that allows user 102(1) to specify one or more destinations for the email. Here, user 102(1) has specified an email address 204 corresponding to user 102(2) ("User_102(2)@email.com) and, hence, corresponding to mail client 112(2).

Message window 200 further includes an illustrative menu 206 that allows a user to select one or more additional email addresses 208, 210, etc. to place into address well 202. In some instances, menu 206 displays email addresses as determined by affinity calculator 120 and address suggestion engine 122 of FIG. 1. For instance, address suggestion engine 122 may determine which address or addresses user 102(1) has entered into address well 202 (e.g., when user 102(1) types a semicolon (;) after the email address in address well 202). Engine 122 may then reference affinity calculator 120 to determine those address(es) that have most frequently been used with the entered address. In some instances, address suggestion engine 122 then displays these address(es) in menu 206 in an order that is dependent on the tracked frequency. For instance, these address(es) may appear in descending order beginning with an email address having a highest affinity for the email address(es) already entered into address well 202.

In the current example, user 102(1) has entered email address 204 (corresponding to user 102(2)) into address well 202. With reference to table 130 of FIG. 1, affinity calculator 120 has determined that of the emails that user 102(1) has sent to user 102(2), these emails have most often included user 102(3). That is, affinity calculator 120 has determined that each email address corresponding to users 102(3)-(N) have been used in an email with email address 204 (corresponding to user 102(2)) the following number of times:

User 102(2) and User 102(3)=15 emails
User 102(2) and User 102(N)=5 emails
User 102(2) and User 102(4)=0 emails Based on this information, address suggestion engine 122 may display, at the top of menu 206, the email address corresponding to user 102(3). That is, because user 102(1) has most often included the email address of user 102(3) in emails sent to user 102(2), engine 122 may infer that user 102(1) will most likely include this email in address well 202 of the current email. As such, menu 206 displays email address 208 ("User_102(3)@email.com") at the top of menu 206. Here, menu 206 also includes an identification of user 102(3) ("John Jones").

Address suggestion engine 122 may similarly determine that user 102(N) is the next most likely address that user 102(1) will select to include in the current email, based on the information tracked by affinity calculator 120. As such, menu 206 next includes email address 210 ("User_102(N)@email.com"), corresponding to user 102(N) ("Steve Smith"). Furthermore, menu 206 is shown to include a series of ellipses, indicating that if calculator 120 had tracked that user 102(1) had also included other, non-illustrated email addresses in emails sent to user 102(2), then menu 206 may similarly include some or all of these addresses. Also note that in the illustrated implementation, menu 206 does not include an email associated with user 102(4), as affinity calculator 120 has determined that user 102(1) has never sent an email to both user 102(2) and user 102(4).

In some implementations, address suggestion engine 122 may limit the number of email addresses suggested in menu 206. For instance, address suggestion engine 122 may display a threshold number of email addresses in menu 206. That is, engine 122 may display, for example, the ten email addresses that have most frequently been used together with email address 204.

Additionally or alternatively, engine 122 may limit the displayed email addresses by a threshold affinity. For instance, engine 122 may display those email addresses that have been used a threshold number of times (e.g., ten times) with the email address(es) entered into address well 202. Of course, engine 122 may employ other criteria (singly or in combination) when determining which addresses to include in menu 206. Furthermore, it is noted that while the current example depicts menu 206 as listing the email addresses in descending order according to the frequency data measured by affinity calculator 120, other implementations may list these addresses in other systematic or random manners.

As illustrated, menu 206 may further include an icon 212 entitled (for example) "Insert All Listed Addresses". When selected, icon 212 may cause each listed email address 208, 210, etc. to be entered into address well 202. In other non-illustrated embodiments, menu 206 may alternatively or additionally include checkboxes or the like next to each listed email address in order to allow user 102(1) to select a subset of the listed addresses.

Menu 206 also includes an icon 214 ("Create an Email Distribution List") that allows a user to create an email distribution list in response to entering email address 204 into address well 202 of message window 200. When user 102(1) selects icon 214, distribution-list suggestion engine 126 may allow user 102(1) to create such an email distribution list. As illustrated and described below with reference to FIG. 4, when icon 214 is selected, engine 126 may suggest to user 102(1) an email distribution list that includes the email addresses 208, 210, etc. currently listed in menu 206, as well as the email address 204 currently entered into address well 202. Of course, in other implementations, engine 122 may suggest other email addresses or may not suggest particular addresses at all. Furthermore, while FIG. 2 illustrates icons 212 and 214 within menu 206, one or both of these icons may appear in a different location in some implementations. For instance, icon 214 ("Create an Email Distribution List") may appear adjacent address well 202 as a part of message window 200, as discussed below with reference to FIG. 7.

FIG. 3 illustrates message window 200 after user 102(1) has selected an email address from menu 206. Here, user 102(1) has selected email address 208, corresponding to user 102(3), and address 208 is therefore now shown within address well 202. After user 102(1) selects this new address, address suggestion engine 122 and distribution-list suggestion engine 126 again provide a menu 300 that may suggest one or more email addresses and may suggest creation of one or more distribution lists.

In order to determine which addresses to include in menu 300, address suggestion engine 122 again references data tracked by affinity calculator 120. For instance, engine 122 may determine which email addresses have been used most frequently with email address 204 and/or email address 208. In some instances, engine 122 determines how many times each other email has been used with each individual address entered into address well 202, and then sums these numbers. Engine 122 may then list these email addresses in menu 300 in descending order beginning with the email address having the highest summed tracked frequency. Of course, other implementations may determine the affinity and display the determined affinity in other ways.

Here, affinity calculator 120 has determined that the email addresses corresponding to users 102(4) and 102(N) have been used in an email with email address 204 (corresponding to user 102(2)) the following number of times:
User 102(2) and User 102(4)=0 emails
User 102(2) and User 102(N)=5 emails Affinity calculator 120 has also determined that the email addresses corresponding to users 102(4) and 102(N) have been used in an email with email 208 (corresponding to user 102(3)) the following number of times:
User 102(3) and User 102(4)=12 emails
User 102(3) and User 102(N)=23 emails Address suggestion engine 122 may then sum these numbers in this implementation to determine that the email addresses corresponding to users 102(4) and 102(N) have been used in an email with email address 204 (corresponding to user 102(1)) or email 208 (corresponding to user 102(3)) the following number of times:
(User 102(2) or 102(3)) and User 102(4)=12 emails
(User 102(2) or 102(3)) and User 102(N)=28 emails Based on this information, address suggestion engine 122 may display, on menu 300, the email address corresponding to user 102(N) at the top of the menu. That is, because user 102(1) has most often included the email address of user 102(N) in emails sent to user 102(2) and emails sent to user 102(3), engine 122 may infer that user 102(1) will most likely include this email in address well 202 of the current email. As such, menu 300 displays email address 210 ("User_102(N) @email.com") at the top of menu 300. Next, menu 300 may list the next most frequently used address, which here is an email address 302 ("User_102(4)@email.com"). Here, menu 300 also includes an identification of user 102(4) ("Bob Burns"). Again, menu 300 also includes a series of ellipses to indicate that menu 300 may include other email addresses that have also been used with emails sent to user 102(2) and/or user 102(3). These addresses may be listed in an order determined by tracked frequency, as discussed immediately.

Furthermore, if user 102(1) selects one of email addresses 210 or 302 from menu 300, then address suggestion engine 122 may then run the same calculation. That is, engine 122 may reference the frequency data tracked by affinity calculator 120 to determine which addresses to display in another menu. Additionally, note that menu 300 again includes icons 212 and 214. When selected, the former icon may insert each email address listed in menu 300 into address well 202, while the latter icon may allow the user to create a distribution list, as discussed immediately below.

Figure 4:
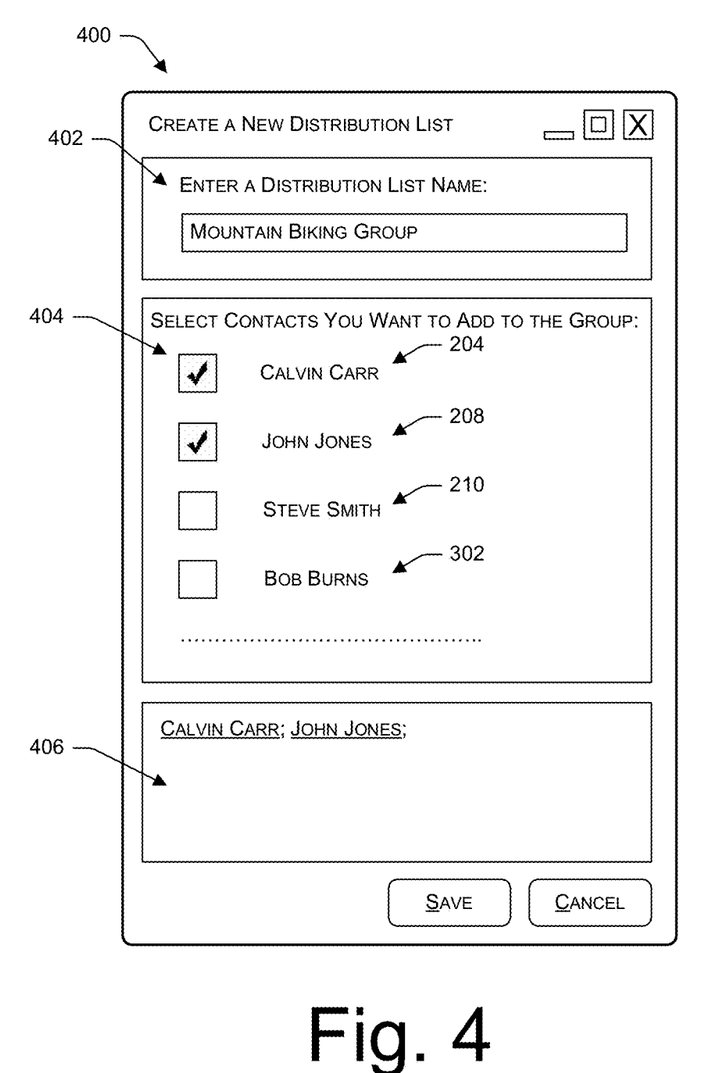
FIG. 4 depicts an illustrative UI that may be displayed if the user selects to create an email distribution list from the UI of FIG. 2 or 3. Here, the UI lists those email addresses that have been used frequently with the email address(es) that was already entered into the address well of the message window of FIG. 2 or 3.

FIG. 4 depicts an illustrative UI that distribution-list suggestion engine 126 may display if the user selects to create an email distribution list from the UI of FIG. 2 or 3. That is, engine 126 may cause computing device 104(1) to render a menu 400 in response to user 102(1) selecting icon 214 ("Create an Email Distribution List") from menu 206 or menu 300. Here, menu 400 has been rendered based on user 102(1) selecting icon 214 from FIG. 3. As illustrated, menu 400 lists those email addresses that have been used frequently with the email addresses 204 and 208 that were already entered into address well 202 of the message window 200 of FIG. 3.

Menu 400 includes an area 402 (entitled, for example, "Enter a Distribution List Name") that allows user 102(1) to enter a name for the new distribution list (e.g., "Mountain Biking Group", "College Friends", "Family", "Work", etc.). Menu 400 also includes an area 404 that allows a user to select one or more contacts (here, associated with email addresses) to include in the distribution list. Here, area 404 lists those email addresses that were entered into address well 202 of FIG. 4 (email addresses 204 and 208) as well as those addresses that were displayed on menu 300 (email addresses 210 and 302). Note that the identity of "Calvin Carr" corresponds to email address 204 associated with user 102(2), which was entered into address well 202 in both FIGS. 2 and 3.

The addresses that area 404 lists may be ordered in different manners. For instance, the addresses may be ordered such that those addresses already entered into address well 202 appear first and are followed by those addresses that appear in menu 300. Alternatively or additionally, these addresses may be listed alphabetically, strictly based on the tracked frequency of use with one another, or in any other manner.

While area 404 may list each address listed in menu 300, area 404 may alternatively limit the number of listed addresses. As discussed above with regards to menu 206, engine 126 may limit the addresses listed in area 404 to a certain threshold number (e.g., ten addresses). Engine 126 may alternatively or additionally list those addresses that have been used with the addresses already entered into address well 202 a threshold number of times (e.g. ten times).

Area 404 may further include a manner to select which names to include in the distribution list. For instance, area 404 here includes a checkbox next to each listed contact, although other similar or dissimilar means for selection may also be used. Note that in this instance, the email addresses that had already been entered into address well 202 (addresses 204 and 208) have been checked by default, while the email addresses that were not yet selected (addresses 210 and 302) have not been selected by default. Of course, in other implementations none, some, or all of the listed addresses may be selected by default.

Finally, menu 400 here includes a text box 406 that lists the contacts selected for inclusion in the distribution list. Because the contacts associated with email addresses 204 and 208 have been selected, the corresponding name of the contacts have been placed in text box 406. In addition to displaying the selected contacts, text box 406 may allow, in some instances, user 102(1) to type additional email addresses or contact names into the text box for inclusion in the list.

By suggesting creation of a list that includes these addresses, engine 126 intelligently allows user 102(1) to easily create a distribution list that includes email addresses that are commonly used together. That is, because affinity calculator 120 has tracked which email addresses have often been used with one another, engine 126 may present icon 214 that, when selected, suggests creation of a list that includes likely email address destinations based on the email address(es) already entered into the address well of a message window. By intelligently suggesting creation of this list, and by intelligently suggesting the actual addresses or contacts to include in the list, the cost associated with creating distribution lists is greatly decreased. Because of this cost reduction, user 102(1) (as well as any other users employing mail applications that include this functionality) may be more likely to actually create one or more distribution lists that include those frequently-used email addresses.

Furthermore, while distribution-list suggestion engine 126 may display menu 400 in response to user 102(1) selecting icon 214, other implementations may offer different functionality. For instance, when user 102(1) selects icon 214 from menu 300, engine 126 may create a distribution list from this single selection (e.g., from the single "click" that selected the icon). This created list, for instance, may include each address listed in address well 202, each address displayed in menu 300, or all of these addresses. Here, engine 126 may provide a default name to the list, such as the first-named contact of the list or any other default name. Alternatively, in response to selection of icon 214, engine 126 may present a UI that simply asks user 102(1) to name the distribution list (e.g., a UI that only includes a field for a distribution list name). Once user 102(1) names the list, engine 126 may create the list and assign the given name to the list.

In addition to suggesting creation of distribution lists, distribution-list suggestion engine 126 may suggest use of already-created distribution lists. For instance, when a user enters a particular contact or email address into an address well, engine 126 may determine if the contact or address is a member of any previously-created lists. If so, then engine 126 may suggest to the user the use of the list, in addition or in the alternative to engine 122 suggesting addresses that have been frequently used with the entered address.

FIG. 5 illustrates another UI that may displayed when a user begins to type an email address into address well 202 of a message window 500. Here, engine 126 may present a menu 504 (e.g., an auto-complete menu) that not only lists those contacts that may match the email address being typed, but also lists one or more distribution lists that these contacts are members of.

For instance, FIG. 5 illustrates that user 102(1) begins entering a string 502 that comprises the letters "Joh" into address well 202. Mail client 112(1) may include, in menu 504, contacts or email addresses that match these entered letters. For example, menu 504 may include those contacts or email addresses that user 102(1) (and corresponding mail client 112(1)) has previously sent or received messages to or from.

For instance, menu 504 here includes "John Jones" (corresponding to email address 204) as well as "John Jacobs" (corresponding to another email address 506 that itself corresponds to an illustrative user 102(46)). However, menu 504 may also include one or more distribution lists that may match the entered letters. That is, engine 126 may determine whether the contacts determined by mail client 112(1) to match string 502 are themselves members of one or more distribution lists. Here, engine 126 may therefore determine whether user 102(3) and/or user 102(46) are members in a distribution list.

Continuing the example of FIG. 4, imagine that user 102(1) has indeed employed the UI of FIG. 4 to create a distribution list 508 (entitled "Mountain Biking Group") that includes user 102(3). As such, engine 126 may determine that user 102(3) is a member of distribution list 508 and many include distribution list 508 in menu 504. User 102(3) may then select distribution list 508 from menu 504 in order to send the email to each member of the list. Therefore, user 102(1) does not need to remember the name of each distribution list that he or she has created. Instead, user 102(1) may merely begin to enter one or more members of a list into address well 202 and, in response, engine 126 will display the distribution lists to which the entered one or more addresses are members of.

Here, engine 126 has included two distribution lists (distribution lists 508 and 124(1)) in menu 504. That is, engine 126 has determined that either or both of user 102(3) and user 102(46) are members of these two distribution lists. Therefore, user 102(1) may conveniently select either of these groups in response to entering "Joh" into address well 202.

Menu 504 may additionally include an icon 510 representing that a listed contact corresponds to a single contact or email address. Menu 504 may similarly include an icon 512 representing that a distribution list is indeed a distribution list. As such, menu 504 here illustrates icon 510 as an individual and icon 512 as a group of individuals. Of course, it is to be appreciated that these icons are merely illustrative and that multiple other icons (or no icons at all) may similarly be used.

Figure 6:
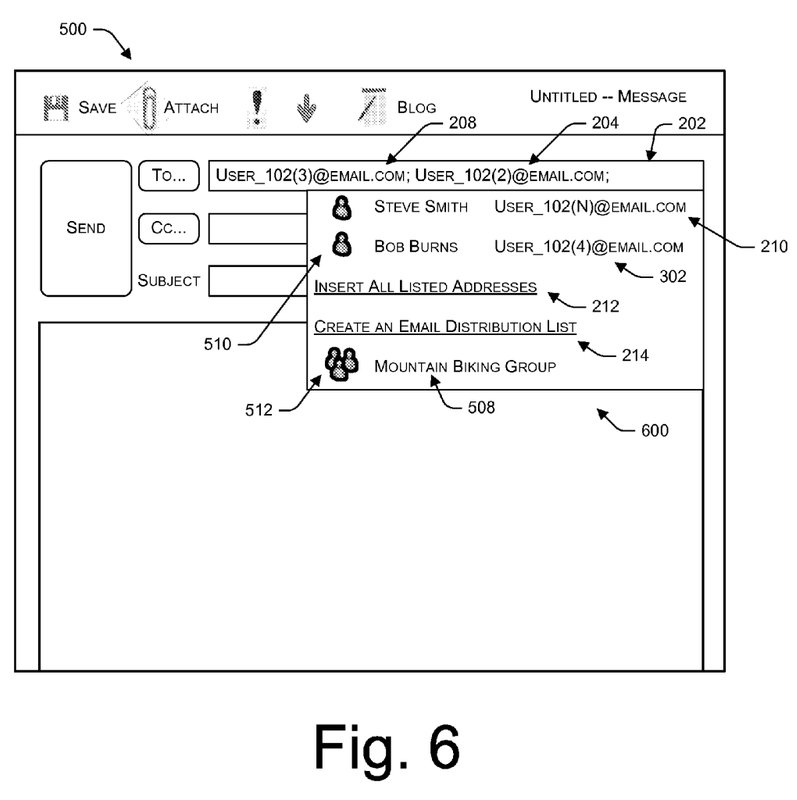
FIG. 6 depicts another illustrative UI that may displayed when a user enters multiple email addresses into the address well of the message window of FIG. 5. Here, the UI has refined the returned distribution lists based on the multiple entered email addresses.

FIG. 6 depicts message window 500 after user 102(1) has entered email addresses 204 and 208 into address well 202. In response, address suggestion engine 122 and distribution-list suggestion engine 126 have displayed a menu 600 that both suggests addresses as well as distribution lists. For example, engine 122 has determined that addresses 210 and 302 are the addresses most frequently used together with addresses 204 and 208, as discussed above with reference to FIG. 3.

Furthermore, engine 126 has determined that only a single distribution list includes both address 204 as well as address 208. Specifically, engine 126 has determined that only the "Mountain Biking Group" Distribution List 508 includes both of these addresses. Therefore, menu 600 lists this distribution list as an option for user selection, while menu 600 does not list distribution list 124(1) ("College Friends") as an option. Therefore, by entering more addresses into address well 202, user 102(1) is able to further refine the returned distribution lists presented in menu 600.

Having discussed the claimed techniques with reference to email, it is again specifically noted that these techniques may apply to many other contexts and in many other environments. For instance, the claimed techniques may be employed for voicemail distribution lists, instant messaging distribution lists, short messaging service (SMS or "text messaging") distribution lists, and/or any other form of communication that employs distribution lists or the like to allow a user to send communications to multiple contacts.

Furthermore, while address suggestions and distribution list suggestions have been illustrated and described with reference to drop down menus, these suggestions may be also be employed in many other manners. For instance, these suggestions may take the form of an auto-complete functionality inside the address well, as selections that that the user may toggle through (e.g., similar to T9 functionality), as audible choices given to a user, or in any other way that allows a user to determine (e.g., visually, audibly, tactilely etc.) and select a suggested contact or distribution list.

Figure 7:
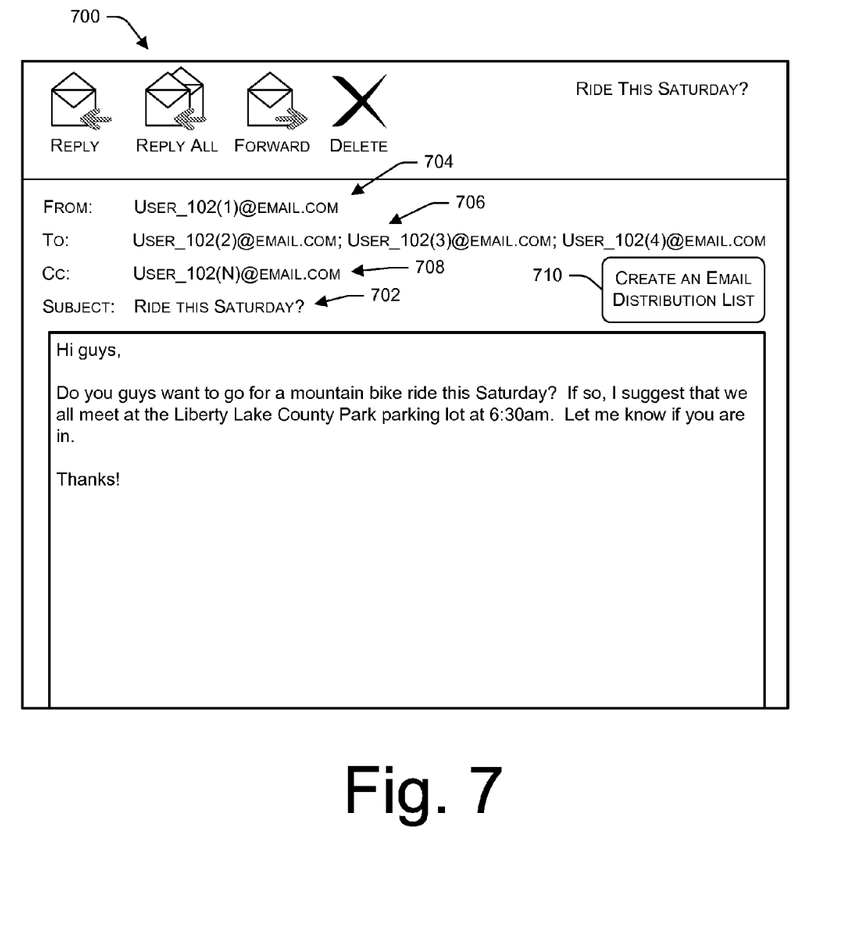
FIG. 7 depicts another illustrative UI that may be displayed when a user views a sent or received email. This email may include an icon adjacent the listed addresses that, when selected, creates or allows creation of a distribution list that includes the listed addresses.

FIG. 7 depicts another illustrative UI that may be displayed when a user views a sent or received email 700. This email may include an icon adjacent the listed addresses that, when selected, creates or allows creation of a distribution list that includes the listed addresses.

Email 700 includes a subject line 702 ("Ride this Saturday?") as well as an indication of an email address 704 from which email 700 was sent. Email 700 also includes an indication of email addresses 706 that email 700 was sent to, as well as an indication of an email address 708 that was cc'ed on the email. Email 700 may comprise a sent email, a received email, or any other type of email (e.g., a saved draft of an email). For instance, user 102(1) may view email 700 in a "sent items" folder, while users 102(2)-(N) may view email 700 in an "inbox" folder.

In either instance, email 700 may include an icon 710 (e.g., entitled "Create an Email Distribution List") that resides adjacent listed addresses 704, 706, and 708. Selection of icon 710 may create or allow creation of a distribution list that includes some or all of the listed addresses. For instance, if a user selects icon 710, an email distribution list may be included that includes those addresses listed in the "to" field, the "cc" field, the "from" field, or any combination therefore.

In some instances, selection of icon 710 directs the user to a menu that allows creation of the distribution list. For instance, selection of icon 710 may direct the user to menu 400 of FIG. 4. Here, the user may select which of the listed addresses to include in the email distribution list. The user may also provide a name for the distribution list (e.g., "Mountain Biking Group").

In other instances, selection of icon 710 may create the email distribution list with the single selection. That is, an email distribution list may be created solely upon the user's selection of icon 710. Here, a default name may be provided for the list, such as the first-named contact of the list or any other default name. Alternatively, in response to selection of icon 710, a UI may be presented that simply asks the user to name the distribution list. Once the user does so, the list may be created and assigned the given name.

Illustrative Processes

Figure 8:
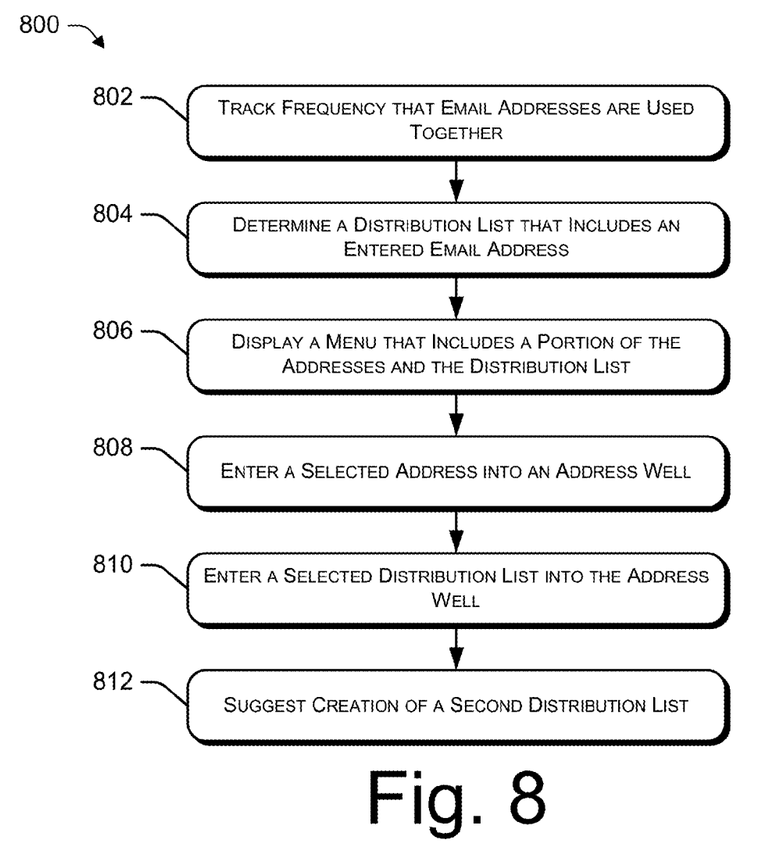
FIGS. 8-10 depict illustrative process for suggesting creation of distribution lists, as well as suggesting use of the distribution lists once they have been created.
Figure 9:
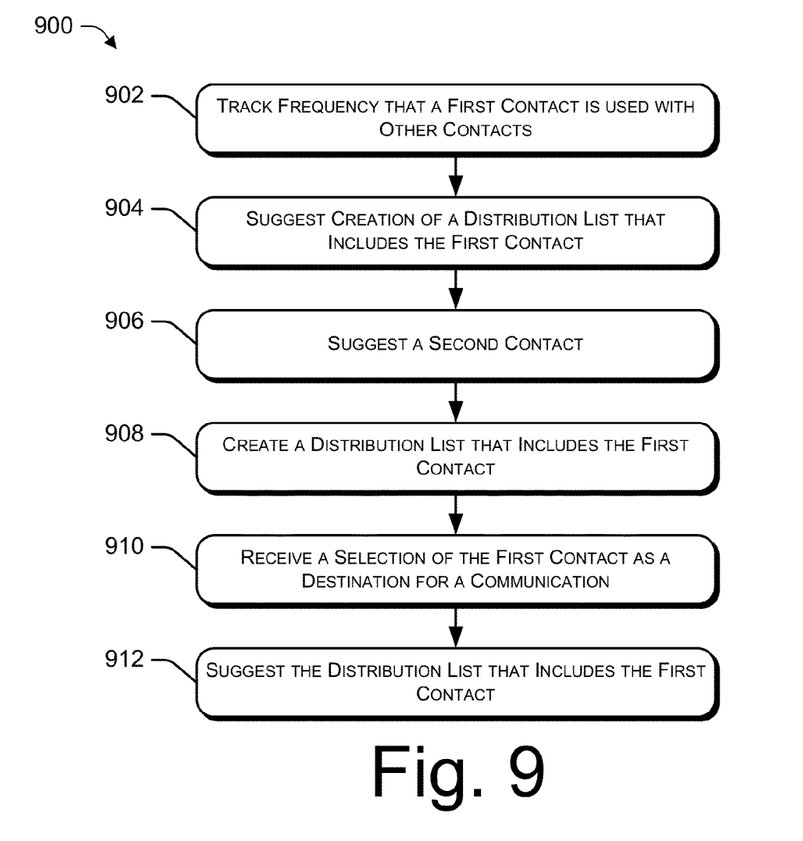
Figure 10:
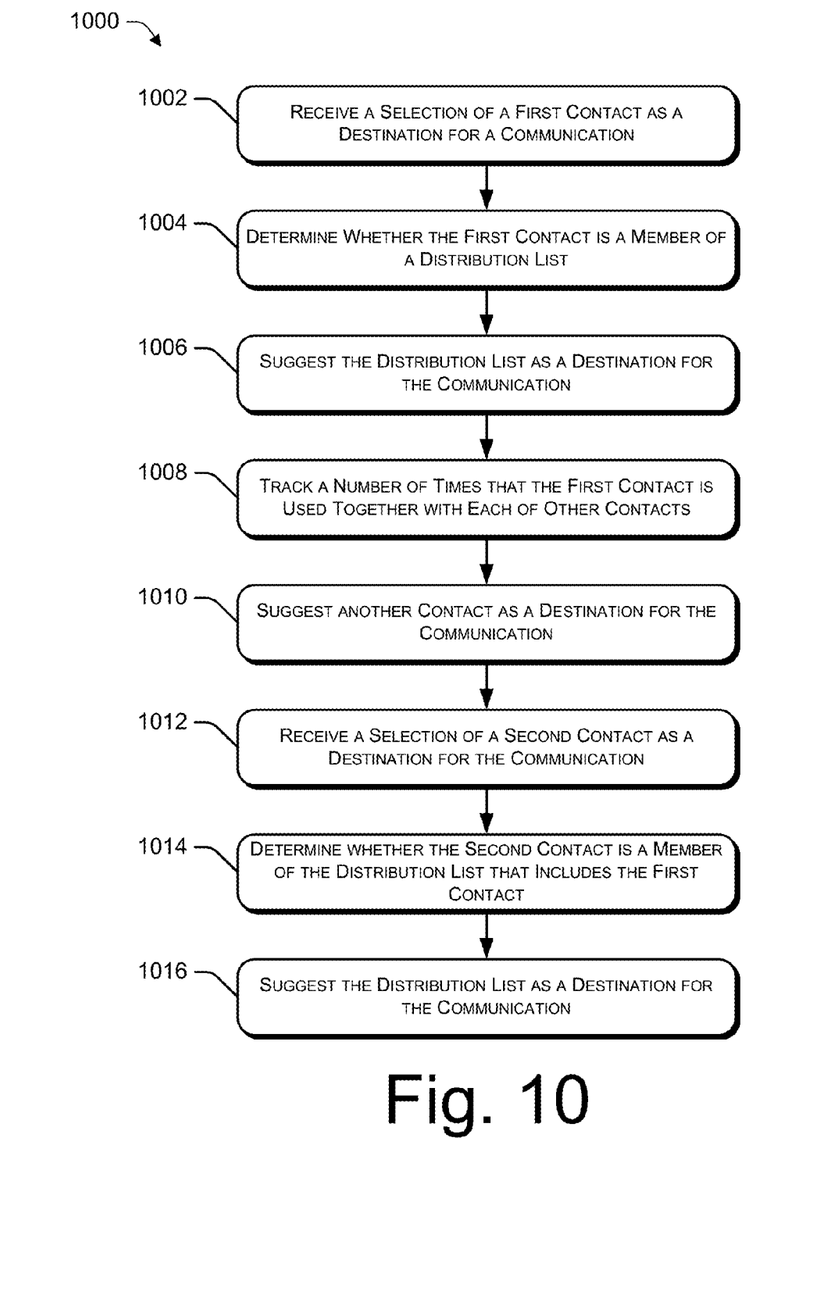

FIGS. 8-10 depict illustrative processes 800, 900, and 1000 for suggesting creation of distribution lists, as well as suggesting use of the distribution lists once they have been created. These processes, as well as other processes described throughout, are illustrated as a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 800 includes operation 802, which represents tracking, for each email address of a group of email addresses, a frequency with which a user sends messages to the respective email address and each other email address of the group of email addresses. In other implementations, this operation could also track how frequently the user receives messages using these email addresses. After a user has entered a respective email address into an address well of a message window, operation 804 represents determining an email distribution list that includes the respective email address entered in the address well of the message window.

Next, operation 806 represents displaying a menu that includes: (i) at least a portion of the email addresses of the group of email addresses in an order based at least in part on the tracked frequency between a respective email address and each email address of the portion, and (ii) an email distribution list that includes the respective email address entered in the address well of the message window. Responsive to the user selecting an email address of the portion of the email addresses of the group, operation 808 then enters the email address into the address well of the message window. Similarly, in response to the user selecting the email distribution list, operation 810 enters the email distribution list or each email address of the email distribution list into the address well of the message window. Finally, operation 812 suggests creation of a second distribution list by displaying an icon that, when selected, displays a list of email addresses to select to include in the second distribution list, the list of email addresses being populated based on the tracked frequency with which the user sends messages to the respective email address and each other email address of the group of email addresses.

FIG. 9 illustrates process 900, which includes an operation 902. This operation represents tracking, for a first contact of a group of contacts, a frequency that the first contact is used together in a communication with each other contact of the group of contacts. Responsive to the first contact being selected for use in a communication, operation 904 then suggests creation of a distribution list that includes the first contact and one or more other contacts of the group of contacts determined, at least in part, on the tracked frequency between the first contact and each other contact of the group of contacts. Next, operation 906 suggests, for inclusion in the communication, a second contact of the group of contacts at least in part based on the tracked frequency between the first contact and the second contact. In some instances, this operation occurs responsive to the first contact being selected for use in a communication.

Operation 908, meanwhile, represents creating a distribution list that includes the first contact and one or more other contacts of the group of contacts. Operation 910 then receives a selection of the first contact as a destination for a communication. In response, operation 912 suggests the distribution list that includes the first contact and one or more other contacts of the group of contacts as a destination for the communication.

FIG. 10 illustrates process 1000, which includes receiving a selection of a contact as a destination for a communication at operation 1002. Operation 1004 then determines whether the selected contact is a member of a distribution list. If it is determined that the selected contact is a member of a distribution list, then operation 1006 suggests the distribution list as a destination for the communication responsive to the receiving of the selection of the contact.

Operation 1008, meanwhile, tracks a number of times that the contact is used together in a communication with each of multiple other contacts. This may include, for example, tracking sent and/or received communications. Responsive to the receiving of the selection of the contact, meanwhile, operation 1010 may then suggest one or more other contacts as destinations for the communication based, at least in part, on the tracked number of times that the contact has been used together with each of the multiple other contacts.

Next, operation 1012 receives a selection of a second contact as a destination for a communication. Operation 1014 then determines whether the selected second contact is a member of a distribution list that also includes the selected first contact. If so, then operation 1016 suggests the distribution list as a destination for the communication responsive to the receiving of the selection of the first contact and the second contact as a destination for the communication.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable devices storing computer-executable instructions that, when executed on one or more processors, perform acts comprising:

tracking, for each email address of a group of email addresses, a frequency with which a user exchanges messages with a respective email address and each other email address of the group of email addresses;

responsive to tactilely selecting a pictorial icon associated with the respective email address:
  entering the respective email address into an address well of a message window;
  determining a previously-created email distribution list that includes the respective email address;
  causing display of a menu that includes corresponding pictorial icons associated with at least:
    a portion of the email addresses of the group of email addresses, the portion being selected based at least in part on the tracked frequency between the respective email address and each email address of the portion; and
    the previously-created email distribution list that includes the respective email address; and responsive to tactilely selecting one or more of the corresponding pictorial icons associated with one or more email addresses of the portion of the email addresses:
  determining one or more previously-created email distribution lists that include both the respective email address and the one or more email addresses of the portion of the email addresses; and
  causing display of the menu or a different menu that includes one or more pictorial icons associated with a corresponding one of the one or more previously-created email distribution lists that include both the respective email address and the one or more email addresses of the portion of the email addresses.

2. One or more computer-readable devices as recited in claim 1, further storing computer-executable instructions that, when executed on the one or more processors, perform an act comprising:

responsive to the tactilely selecting the one or more of the corresponding pictorial icons associated with the one or more email addresses of the portion of the email addresses:
  determining at least one additional email address of the group of email addresses based in part on a determined frequency with which the user exchanges messages with the combination of the respective email address, the one or more email addresses of the portion of the email addresses and the at least one additional email address; and
  causing display of the menu or the different menu that includes at least one pictorial icon associated with the at least one additional email address.

3. One or more computer-readable devices as recited in claim 1, further storing computer-executable instructions that, when executed on the one or more processors, perform an act comprising:

responsive to tactilely selecting the pictorial icon associated with the previously-created email distribution list, entering the previously-created email distribution list or each email address of the previously-created email distribution list into the address well of the message window.

4. One or more computer-readable devices as recited in claim 1, wherein the previously-created email distribution list is a first distribution list, and further storing computer-executable instructions that, when executed on the one or more processors, perform an act comprising:

suggesting creation of a second distribution list by displaying an icon that, when selected, displays corresponding pictorial icons associated with a list of email addresses to select to include in the second distribution list, the list of email addresses being populated based on the tracked frequency with which the user exchanges messages with the respective email address and each other email address of the group of email addresses.

5. One or more computer-readable devices storing computer-executable instructions that, when executed on one or more processors, perform acts comprising:
tracking, for a first contact of a group of contacts, a frequency that the first contact is used together in a communication with each other contact of the group of contacts;
responsive to tactilely selecting a pictorial icon associated with the first contact;
entering an email address of the first contact into an address well of a message window;
determining one or more previously-created distribution lists having the first contact as a member;
causing display of a menu that includes corresponding pictorial icons associated with at least:
a portion of contacts of the group of contacts, the portion being selected based at least in part on the tracked frequency between the first contact and each contact of the group of contacts; and
the one or more previously-created distribution lists having the first contact as a member;
suggesting creation of a distribution list that includes the first contact and the portion of contacts of the group of contacts;
responsive to tactilely selecting at least one pictorial icon associated with at least one contact of the portion of contacts;
determining a previously-created joint distribution list having as members both the first contact and the at least one contact of the portion of contacts; and
causing display of the menu or a different menu that includes a pictorial icon associated with the previously-created joint distribution list.

6. One or more computer-readable devices as recited in claim 5, further storing computer-executable instructions that, when executed on the one or more processors, perform an act comprising:
responsive to tactilely selecting the pictorial icon associated with the first contact for use in a communication, suggesting for inclusion in the communication a second contact of the group of contacts at least in part based on the tracked frequency between the first contact and the second contact.

7. One or more computer-readable devices as recited in claim 5, wherein the suggesting the creation of the distribution list comprises displaying an icon that, when selected, displays pictorial icons associated with a list of contacts to select to include in the distribution list, the list of contacts being determined based on the tracked frequency between the first contact and each other contact on the list of contacts.

8. One or more computer-readable devices as recited in claim 5, wherein the first contact is represented by a first email address and each of the other contacts being represented by an email address, the tracking of the frequency comprises tracking a frequency that emails are exchanged with the first email address and each other email address of the group of contacts.

9. One or more computer-readable devices as recited in claim 5, further storing computer-executable instructions that, when executed on the one or more processors, perform acts comprising:
tracking, for each other contact of the group of contacts, a frequency that the respective contact is used together in a communication with each other contact of the group of contacts; and
responsive to the respective contact being selected for use in a communication, suggesting creation of a distribution list that includes the respective contact and one or more other contacts of the group of contacts determined, at least in part, on the tracked frequency between the respective contact and each other contact of the group of contacts.

10. One or more computer-readable devices as recited in claim 5, further storing computer-executable instructions that, when executed on the one or more processors, perform acts comprising:
tracking, for a second contact of the group of contacts, a frequency that the second contact is used together in a communication with each other contact of the group of contacts; and
responsive to the first contact and the second contact being selected for use in a communication, suggesting for inclusion in the communication a third contact of the group of contacts at least in part based on the tracked frequency between the first contact and the third contact and the tracked frequency between the second contact and the third contact.

11. One or more computer-readable devices as recited in claim 5, further storing computer-executable instructions that, when executed on the one or more processors, perform acts comprising:
creating a distribution list that includes the first contact and one or more other contacts of the group of contacts;
receiving a selection of the first contact as a destination for a communication;
determining one or more previously-created distribution lists having the first contact and a second contact as members; and
suggesting the one or more previously-created distribution lists that includes the first contact, the second contact and one or more other contacts of the group of contacts as a destination for the communication responsive to the receiving of the selection of the first contact.

12. One or more computing devices comprising:
one or more processors; and
the one or more computer-readable devices storing the computer-executable instructions as recited in claim 5.

13. A method comprising:
tracking, for each email address of a group of email addresses, a frequency with which messages are exchanged with a respective email address and each other email address of the group of email addresses;
responsive to tactilely selecting a pictorial icon associated with the respective email address:
entering the respective email address into an address well of a message window;
determining a previously-created email distribution list that includes the respective email address;
causing display of a menu that includes corresponding pictorial icons associated with at least:
a portion of the email addresses of the group of email addresses, the portion being selected based at least in part on the tracked frequency between the respective email address and each email address of the portion; and
the previously-created email distribution list that includes the respective email address; and responsive to tactilely selecting one or more of the corresponding pictorial icons associated with one or more email addresses of the portion of the email addresses:
  determining one or more previously-created email distribution lists that include both the respective email address and the one or more email addresses of the portion of the email addresses; and
  causing display of the menu or a different menu that includes one or more pictorial icons associated with a corresponding one of the one or more previously-created email distribution lists that include both the respective email address and the one or more email addresses of the portion of the email addresses.

14. The method as recited in claim 13, further comprising: responsive to the tactilely selecting the one or more of the corresponding pictorial icons associated with the one or more email addresses of the portion of the email addresses:
  determining at least one additional email address of the group of email addresses based in part on a determined frequency with which messages are exchanged with the combination of the respective email address, the one or more email addresses of the portion of the email addresses and the at least one additional email address; and
  causing display of the menu or the different menu that includes at least one pictorial icon associated with the at least one additional email address.

15. The method as recited in claim 13, further comprising:
  responsive to tactilely selecting the pictorial icon associated with the previously-created email distribution list, entering the previously-created email distribution list or each email address of the previously-created email distribution list into the address well of the message window.

16. The method as recited in claim 13, wherein the previously-created email distribution list is a first distribution list, and the method further comprising suggesting creation of a second distribution list by displaying an icon that, when selected, displays corresponding pictorial icons associated with a list of email addresses to select to include in the second distribution list, the list of email addresses being populated based on the tracked frequency with which messages are exchanged with the respective email address and each other email address of the group of email addresses.

17. One or more computing devices comprising:
  one or more processors; and
  one or more computer-readable devices storing computer-executable instructions to implement the method as recited in claim 13.

* * * * *